March 19, 1935.  W. R. NISBET  1,994,864
DEHORNING DEVICE
Filed Oct. 23, 1933

Inventor
W. R. Nisbet
By Samuel Scrivener
Attorney

Patented Mar. 19, 1935

1,994,864

UNITED STATES PATENT OFFICE 1,994,864

DEHORNING DEVICE

Walker R. Nisbet, Sonora, Tex.

Application October 23, 1933, Serial No. 694,857

7 Claims. (Cl. 128—308)

This invention relates broadly to cutting devices and, more particularly, to devices for dehorning cattle or for similar purposes.

It is an object of the present invention to provide a dehorning device which will provide a shearing effect as well as a cutting effect when the invention is employed for the purposes intended.

Another object of the invention is to provide a dehorning device comprising a blade which will be so formed as to provide a shearing effect in cooperation with a second blade.

Another object of the invention is to provide a dehorning device which will comprise a blade which will provide a cutting effect in cooperation with the blade providing the shearing effect.

A further object is to provide a dehorning device of novel construction, the parts of which may be easily and cheaply manufactured but which are, nevertheless, strong and rugged in construction.

Other objects and features of novelty will be apparent from the following description and drawing, it being expressly understood, however, that the invention is in no way limited by such description and drawing, or otherwise than by the appended claims.

Referring to the drawing, in which similar reference characters refer to like parts:

Figure 1:
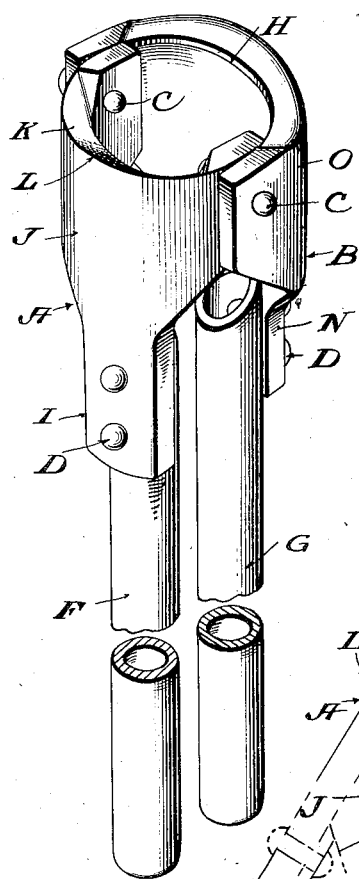
Fig. 1 is a perspective view of the device according to the invention.
Figure 3:
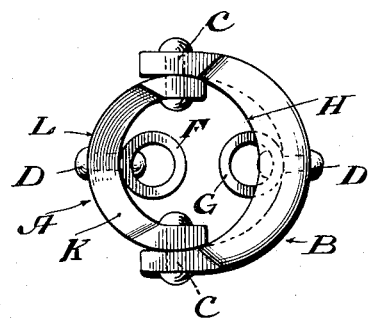
Fig. 3 is an end view of the device according to the invention.
Figure 2:
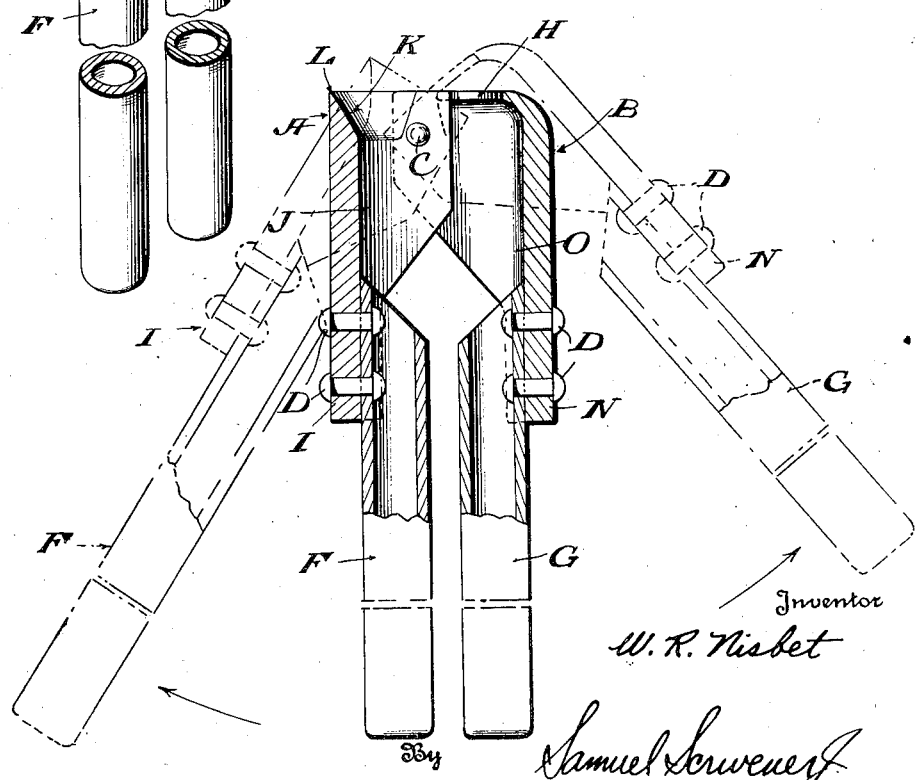
Fig. 2 is a longitudinal sectional view of the device.

Referring particularly to Figs. 1 and 2 of the drawing it will be seen that the dehorning device according to the present invention comprises two blade members A, B, the same being pivotally connected adjacent the cooperating ends thereof by pivot members C. The opposite ends of each of the blade members are connected to handles F, G, by means of rivets D, although it will be apparent that the handles may be welded to the blades or fastened thereto in any suitable manner or, if desired, each blade may be formed integrally with its cooperating handle member.

The blade A which is primarily the cutting blade of the dehorning device, comprises a reduced shank portion I to which a handle may be attached in any suitable manner as described hereinbefore. This blade also comprises an enlarged portion J which is generally semi-cylindrical in form. The outer end portion of the part J of the blade is cut away, as at K, from a point on the inner surface of the part J to the outer periphery of the outer surface of such part, whereby such outer periphery forms a cutting edge L. An arcuate generally concaved surface is thereby formed interiorly of the outer end of the blade, and it is to be noted that such concaved, cutaway portion may extend throughout only a portion of the semi-circular extent of the blade, as indicated clearly in the drawing. Holes may be formed in diametrically opposed portions of the blade to receive the pivot pins C.

The blade B, which is primarily the shearing blade of the dehorning device, comprises a reduced shank portion N to which a handle may be attached in any suitable manner as described hereinbefore. This blade also comprises an enlarged portion O which is generally semi-cylindrical in form and of such interior diameter that the blade A may be received between the diametrical walls of the same. The enlarged portion O of the blade comprises semi-cylindrical inner and outer faces. Adjacent the outer end of the blade such faces are turned inwardly of the blade and converge slightly to terminate in an arcuate surface H, which is disposed inwardly of the inner face of the blade and the axial dimension of which is disposed at right angles to the plane of the outer end of the blades, or in other words, parallel to the axial dimensions of the outer and inner faces of the blade. It will be observed that the surface H is formed on an arc that is of approximately the same radius as the edge L of blade A in order that such surface H may closely cooperate with edge L in the cutting operation and may also provide a close fit with the outer face of blade A when the blades are fully opened. Aligned openings may be formed in diametrically-opposed portions of the part O for receiving the pivot pins C.

Referring now to Fig. 2 of the drawing, it will be seen that the sectional portion thereof illustrates the assembled relation of the two blades when the same are in open or inoperative position, the two blades being pivotally connected by pivot pins C, whereby the blades may be opened or closed by manipulation of the handles F, G, attached thereto. It will be observed that the semi-cylindrical portion of blade A is disposed partially within the confines of the similar part of blade B, as particularly disclosed in Fig. 1. It will also be observed that in the assembled position of the blades the semi-cylindrical portions of the blades are opposed, thereby forming in effect a cylindrical opening into which a horn or similar member may be received for cutting purposes.

If it is now desired to operate the dehorning device, the handles F, G are grasped and pulled apart, thus causing the blade members to pivot about the pins C and the cutting and shearing edges thereof to approach each other. If such operation be continued, the shearing edge or surface H will describe an arc about the pivots C, while the cutting edge L of blade A will likewise travel along the same arc. The edge L, being sharp, will cut into the horn or other member disposed between the blades, while the edge or surface H will exert a shearing force on such horn or other member and will also provide the resistance necessary to enable edge L to properly cut the horn or other member. Due to the semi-cylindrical form of the two blades, and also to the fact that blade B is larger than blade A, a complete cutting stroke of the blades may be performed without causing any binding or jamming between the two blades. It should also be observed that the two blades are so proportioned, and the pivots C so placed, that the shearing edge H of blade B will just pass the edge L of blade A, whereby a clean and straight cut is insured. Also, when the blades are brought to their fully closed position, the arcuate surface H of blade B will rest flatly, throughout its length, against the outer face of blade A, whereby any dulling or upsetting of the shearing edges of blade B will be prevented.

The blades may be brought to open or inoperative position again by bringing the handles together.

While I have described and illustrated one embodiment of my invention, it will be apparent to those skilled in the art that modifications and changes may be made therein without departing in any way from the spirit of the invention for the limits of which reference must be had to the appended claims.

What is claimed is:

1. A cutting device comprising cooperating blade members, one of said blade members having a semi-cylindrical portion terminating in an arcuate surface disposed inwardly of the inner face of said semi-cylindrical portion.

2. A cutting device comprising a blade member having an outer face and an inner face, said faces being turned toward the axis of the blade member and converging to provide an arcuate surface providing a shearing edge, and a second blade member having a portion cooperating with said shearing edge.

3. A cutting device comprising cooperating semi-cylindrical blade members, one of said blade members having a sharp edge adjacent its outer face, another of said blade members terminating at its outer end in an arcuate surface axially parallel with the walls of said blade member.

4. A cutting device comprising cooperating semi-cylindrical blade members, one of said blade members having outer and inner faces, said faces being turned and converging to provide a flat surface axially parallel with said faces.

5. A cutting device comprising cooperating semi-cylindrical blade members pivotally connected together, one of said blade members having a sharp cutting edge and another of said blade members having an arcuate surface providing a shearing edge disposed inwardly of said blade member, and a handle member rigidly connected to each of said blade members.

6. A cutting device comprising an arcuate blade member having inner and outer faces, a second arcuate blade member having diametrically-opposed portions disposed outside of the first-mentioned blade member, and an inturned arcuate face on said second blade member, said face being concentric with the outer face of said first-named blade member.

7. A cutting device comprising an arcuate blade member having an inner face and an outer face, a second arcuate blade member having an inner face and an arcuate face disposed inwardly of said inner face, said arcuate face being concentric with the outer face of said first-named blade member.

WALKER R. NISBET.